United States Patent [19]

Agree et al.

[11] Patent Number: 5,719,224
[45] Date of Patent: Feb. 17, 1998

[54] COMPOSITIONS AND METHODS FOR DETACKIFYING PAINT SPRAY BOOTH WATER

[75] Inventors: Howard B. Agree, Newtown; Jen-Chi Chen, Morrisville; Robert A. Iezzi, Malvern, all of Pa.

[73] Assignee: BetzDearborn Inc., Trevose, Pa.

[21] Appl. No.: 738,223

[22] Filed: Oct. 25, 1996

Related U.S. Application Data

[60] Division of Ser. No. 354,690, Dec. 13, 1994, Pat. No. 5,614,103, which is a continuation-in-part of Ser. No. 246,547, May 20, 1994, which is a continuation-in-part of Ser. No. 80,909, Jun. 22, 1993, abandoned.

[51] Int. Cl.$^6$ ........................................... C08K 3/10
[52] U.S. Cl. ................ 524/437; 210/725; 210/728; 210/730; 210/734; 210/930; 524/434; 525/359.3; 527/400
[58] Field of Search .................................. 524/434, 437; 527/400; 525/359.3

[56] References Cited

U.S. PATENT DOCUMENTS

| | | | |
|---|---|---|---|
| 4,800,039 | 1/1989 | Hassick et al. | 252/181 |
| 5,076,939 | 12/1991 | Hunter et al. | 210/712 |
| 5,250,189 | 10/1993 | Rey | 210/712 |
| 5,294,352 | 3/1994 | Waldmann | 210/725 |
| 5,395,536 | 3/1995 | Brown et al. | 210/725 |
| 5,451,326 | 9/1995 | Carlson et al. | 210/708 |

*Primary Examiner*—Judy M. Reddick
*Attorney, Agent, or Firm*—Alexander D. Ricci; Philip H. Von Neida

[57] ABSTRACT

A method and composition for detackifying or coagulating and flocculating waterborne and mixed waterborne/solventborne paints in paint spray booth water. Aluminum chlorohydrate and a tannin containing polymer, preferably in an aqueous solution, are added to the paint spray booth water to detackify or coagulate and flocculate the paints.

8 Claims, No Drawings

– 5,719,224 –

COMPOSITIONS AND METHODS FOR DETACKIFYING PAINT SPRAY BOOTH WATER

This is a divisional of application Ser. No. 08/354,690 filed Dec. 13, 1994 now U.S. Pat. No. 5,614,103 which is a continuation-in-part of Ser. No. 08/246,547 filed May 20, 1994 pending, which is a continuation-in-part of Ser. No. 08/080,909 filed Jun. 22, 1993 now abandoned.

FIELD OF THE INVENTION

The present invention relates to methods for detackifying or coagulating and flocculating waterborne and mixed waterborne/solventborne paints in paint spray booth waters employing a composition of a tannin containing polymer and aluminum chlorohydrate.

BACKGROUND OF THE INVENTION

The spray painting of automobile bodies, truck parts, appliances and other industrial goods is typically carried out in enclosed areas called paint spray booths (PSBs). These booths act to contain solvent fumes and oversprayed paint and reduce the chances of dust contamination in order to protect the paint booth operators and the painted articles. These booths vary in size, but are somewhat basic in their design and operation. A typical booth would thus consist of a work area, back section with mist eliminators and a sump.

The articles to be painted generally pass through the work area while an air flow makes overspray contact either water in the sump or spray from a water curtain. The air is scrubbed with recirculated water at the water curtain, passes through mist eliminators and is removed by an exhaust fan.

Even though paint transfer efficiencies have increased through improved application technologies, roughly one-half of all paint sprayed does not reach its intended article. As a result, significant concentrations of paint buildup in the system and agglomeration can occur. When solventborne paints are used, the resultant mass is a sticky, tacky material which can plug mist eliminators, shower heads, and even recirculating pumps. When waterborne paints are employed, they will remain dispersed in the spray booth water. When present, waterborne paints will not present the same problems as untreated solventborne paint (i.e., tackiness, clumps, etc.). However, failure to remove waterborne paints results in increasing COD (carbon oxygen demand) levels, increasing suspended solids, and increasing levels of foam. All of these conditions decrease water clarity.

When water quality decreases, scrubbing efficiency decreases leading to potentially hazardous conditions of unchecked paint emissions being discharged into the atmosphere. Such conditions may also present severe safety hazards to paint spray booth operators. The paint solids that are collected in the water can form suspensions which remain tacky and create expensive separation and disposal problems.

It is therefore desirable to treat paint spray booth water systems so as to reduce or prevent, as much as possible, the agglomeration and deposition of oversprayed paint on critical paint spray booth operating parts, to render the resultant sludge (in solventborne systems) non-tacky and easily removable, and to provide a water quality such that it can be recycled for use in the system.

The paint employed in typical paint spray booths fall into two generic classes, waterborne and solventborne. Currently, solventborne paints are predominant. However, increased restrictions upon the levels of volatile organic compound emissions are forcing industrial applications to switch to waterborne paints.

The differences in the two paint classifications can be found in their formulations. Solventborne paint typically consists of organic solvents (such as xylene), resin binders, pigments and additives. In waterborne systems, water is substituted for the organic solvent. Thus, the resin binders, pigments, and additives must all be rendered water soluble or dispersible. Resins which are not water soluble can be stabilized with emulsifiers and cosolvents or be reformulated.

The behavior of a solventborne and a waterborne paint will differ when each becomes overspray in a wet paint spray booth. Waterborne paints will disperse in the aqueous medium, while solventborne paints agglomerate into a tacky mass and adhere to paint spray booth operating parts. Because of this behavior in water, in the past, the chemical process by which each paint type is treated differs. In order to remove waterborne paint from an aqueous medium, they should be considered as hydrophilic colloids which must be rendered hydrophobic. The stability of the compounds in water arises from the surface charge generated from carboxylic, aliphatic or aromatic hydroxyl groups on the polymer backbone. The process of destabilizing such solutions is termed coagulation. Flocculation follows in this treatment process whereby the destabilized particles are induced to come together, make contact and form large agglomerants.

Solventborne paints are hydrophobic and their treatment involves partially dispersing the paint particles in the aqueous medium via an anionic dispersant. The partially hydrophilic particles can then be treated to render them non-tacky. This process is referred to as detackification.

SUMMARY OF THE INVENTION

The present invention relates to compositions of water soluble or dispersible tannin containing polymers and aluminum chlorohydrate which have been found to detackify solventborne paints and coagulate and flocculate waterborne paints. The present invention is also effective at treating mixed solventborne/waterborne paints.

DESCRIPTION OF THE RELATED ART

U.S. Pat. No. 4,948,513, Mitchell, teaches methods for detackifying spray booth water containing paint particles by adding a combination of hydrophilic/lipophilic quaternary ammonium repeat unit polymers or diallyldialkyl quaternary ammonium compounds and the reaction product of tannin, an amino compound and an aldehyde.

U.S. Pat. No. 5,073,205, Morse, teaches the use of copolymers of N-methylolacrylamide and methyldiallylamine as detackifiers of solventborne paints in the circulating water of water wash paint spray booths. U.S. Pat. No. 5,250,189, Rey, teaches methods of treating paint spray booth water by maintaining the pH and alkalinity of the PSB water and adding an aluminum salt and a flocculant to the water before contacting the oversprayed, waterborne paint. The aluminum salt can be aluminum chlorohydrate and the flocculant can be a cationic polyelectrolyte or quaternary ammonium polymer. Hunter et al., U.S. Pat. No. 5,076,939, teaches a method similar to Rey but substitutes an alumina coated silica sol for the aluminum salt in the process.

U.S. Pat. No. 4,637,824, Pominville, teaches a method for detackifying airborne paint particles captured in an aqueous wash stream by adjusting the pH to 7 to 12 with an alkali metal silicate and then contacting the paint wastes in the wash water with an amphoteric metal salt such as aluminum chloride and a poly(diallyldimethyl ammonium halide) polymer.

EP 0 525 989A2, Huang et al., teaches a method for detackification of oversprayed paint in wastewater by adding an amphoteric polymer and an aluminum salt. The amphoteric polymer contains both anionic and cationic mer units and preferably in the presence of (meth) acrylamide mer units.

DETAILED DESCRIPTION OF THE INVENTION

The present invention relates to a composition and methods for detackifying or coagulating and flocculating waterborne and mixed waterborne/solventborne paints in paint spray booth water comprising adding to said paint spray booth water an effective amount of a water soluble or dispersible tannin containing polymer and aluminum chlorohydrate.

The tannin containing polymer comprises a water soluble or dispersible polymer composition comprising a copolymer of tannin and a cationic monomer. In another embodiment of the present invention, the tannin containing polymer comprises a polymer of tannin and cationic monomer, with at least one monomer selected from the group consisting of an anionic monomer and a nonionic monomer.

The cationic monomer is selected from a group containing ethylenically unsaturated quaternary ammonium, phosphonium or sulfonium ions. Typical cationic monomers are quaternary ammonium salts of dialkylaminoalkyl(meth) acrylamides, dialkylaminoalkyl(meth)acrylates and diallyl dialkyl ammonium chloride.

The preferred cationic monomers are selected from the group include but are not limited to methyl chloride quaternary salt of diethylaminoethyl acrylate, dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride and diallyldiethyl ammonium chloride. The most preferred cationic monomer is methyl chloride quaternary salt of diethylaminoethyl acrylate.

The anionic monomer is selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2-methyl propane sulfonic acid (AMPS®) and 3-allyloxy-2-hydroxypropane sulfonic acids and salts thereof. The preferred anionic monomer is acrylic acid.

The nonionic monomer is selected from the group of ethylenically unsaturated nonionic monomers which comprise but are not limited to acrylamide, methacrylamide, N-methylolacrylamide, N,N-dimethyl-acrylamide; lower alkyl ($C_1$–$C_6$) esters including vinyl acetate, methyl acrylate, ethyl acrylate, and methyl methacrylate; hydroxylated lower alkyl ($C_1$–$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates. The preferred nonionic monomers are allyl glycidyl ether and acrylamide.

The resulting tannin containing polymer contains from 10 to 80% by weight of tannin, 20 to 90% by weight of cationic monomer, 0 to 30% by weight of nonionic monomer and 0 to 20% by weight of anionic monomer, provided that the resulting tannin containing polymer is still water soluble or dispersible and the total weight % of cationic, nonionic and anionic monomers and tannin adds up to 100%. Preferably, when the cationic monomer and anionic monomer are present together in the tannin containing polymer, the cationic monomer comprises a greater weight percentage than the anionic monomer.

The preferred copolymer of tannin and cationic monomer contains 20 to 80 weight % of tannin. More preferably, the copolymer contains from 30 to 60 weight % of tannin and most preferably, from 30 to 50 weight % of the tannin in the copolymer, provided the total weight of tannin and cationic monomer totals 100 weight %. More preferably still, the copolymers have a weight % of 30% tannin and 70% cationic monomer and 50% tannin and 50% cationic monomer. These particular copolymers are most preferred when the tannin is a Mimosa type tannin and the cationic monomer is methyl chloride quaternary salt of dimethylaminoethyl acrylate.

The number average molecular weight of the resulting tannin containing polymer is not critical, as it is still water soluble or dispersible. The tannin containing polymers may be prepared by mixing the desired monomers with tannin and initiating by a free radical initiator via solution, precipitation or emulsion polymerization techniques. Conventional initiators such as azo compounds, persulfates, peroxides and redox couples may be used. The preferred initiators are 2,2'azobis(2-amidinopropane) dihydrochloride, available as V-50 from Wako Chemicals and t-butylhydroperoxide/sodium metabisulfite (t-BHP/NaMBS). These or other initiators may be added at the end of polymerization to further react with any residual monomers.

Chain transfer agents such as alcohol, amine, formic acid or mercapto compounds may be used to regulate the molecular weight of the polymer. The resulting polymer may be isolated by well known techniques including precipitation, etc., or the polymer may simply be used in its aqueous solution.

The reaction temperature is not critical and generally occurs between 20° and 100° C., preferably 40° to 70° C. The pH of the reaction mixture is also not critical and is generally in the range of 2.0 to 8.0. The resulting tannin containing polymers are characterized by C-13 NMR, Brookfield viscosity and percent solids.

The combination of aluminum chlorohydrate and tannin containing polymer ranges from 10% to 90% aluminum chlorohydrate and 90% to 10% tannin containing polymer by weight. Preferably, the range of aluminum chlorohydrate is from 35% to 45% and the range of tannin containing polymer is from 35% to 45%, with the remainder, by weight, being water.

The preferred tannin containing polymer is a copolymer of tannin and cationic monomer. The copolymer contains 20 to 80% by weight percent of tannin and more preferably 30 to 50 weight percent tannin, with 30% tannin most preferred.

The preferred cationic monomer is methyl chloride quaternary salt of dimethylaminoethylacrylate and the preferred tannin is a Mimosa type tannin. The preferred copolymer will contain 30% by weight of Mimosa tannin and 70% by weight of methyl chloride salt of dimethylaminoethylacrylate.

The composition of the present invention is generally made up in a suitable solvent which is preferably water. The dosage of composition added to the paint spray booth water to be treated ranges from 100 parts to about 2000 parts per million parts paint spray booth water. A dosage range of 500 parts to about 1000 parts per million parts paint spray booth water is preferred.

A preferred composition termed Treatment "A" is 35% aluminum chlorohydrate, 35% tannin containing polymer, and 30% water. The tannin containing polymer is a copolymer of 30% by weight Mimosa tannin and 70% by weight methyl chloride quaternary salt of dimethylaminoethacrylate.

The compositions of the present invention provide good coagulation and flocculation of waterborne paints when the pH of the paint spray booth water is between 7 and 9. It has been found that a small amount of cationic flotation polymer is occasionally necessary to float the detackified paint solids. The pH of the paint spray booth water can be adjusted to the proper range with a caustic such as NaOH and KOH. For solventborne/waterborne paint mixes, a cationic flotation polymer is added to float the detackified paint solids. Examples of suitable cationic flotation polymers include but are not limited to polyacrylamides and acrylamide/20% methyl chloride quaternary salt of diethylaminoethyl acrylate (AETAC).

The methods of the present invention can be enhanced by combining the compositions of the present invention with compounds such as inorganic bases, silicates, acids, and metal salts. Preferred examples include but are not limited to sodium hydroxide, potassium hydroxide, sodium silicate, hydrochloric acid, and aluminum chlorohydrate.

The compositions of the present invention have been found to be an effective treatment of polyacrylic, polyurethane, epoxy, and polyester resin based paints. These paint types can be further classified to include latexes, enamels, lacquers and acrylics.

In order to more clearly illustrate this invention, the data set forth below were developed. The following examples are included as being illustrations of the invention and should not be construed as limiting the scope thereof.

EXAMPLES

The overall performance of the treatment program of the present invention is analyzed for characteristics: detackification, flocculation, and water clarity. A standard jar test procedure is used to determine the functional dosage levels and proper combinations of cationic polymer and inorganic materials. The general procedure is to add 100 mL of tap water to a 120 mL jar. The treatment program is added, and the bottle is capped and shaken to mix the contents. One mL of an automotive paint (waterborne or solventborne/waterborne paint mix) is then added to the jar. After vigorous shaking for 30 seconds, a wooden tongue depressor is immersed in the solution and then removed for examination. The following guidelines are used for examining the detackification performance of the treatment.

| Rating | Definition |
| --- | --- |
| 1 | Paint forms large tacky globules and/or coating which adheres to the exposed surfaces of the jar and tongue depressor. |
| 2 | Paint forms agglomerates which are slightly tacky to the touch, or upon crushing. Paint sludge coats the tongue depressor. |
| 3 | Paint forms granular flocs which adhere to less than 10% of the exposed surface of the jar or depressor. Sludge may be smeary, but not tacky. |
| 4 | Paint forms particles, some of which appear as specs on less than 1% of the exposed surface area of the jar or depressor. Sludge is neither smeary nor tacky. |
| 5 | Paint forms particles which do not adhere to the exposed surfaces of the jar or depressor. The paint sludge may float, sink, or be dispersed in the water. |

The treatment composition utilized in the testing is identified as Treatment A which is 35% aluminum chlorohydrate, 35% tannin containing polymer (copolymer of 30% by weight Mimosa tannin/70% by weight methyl chloride quaternary salt of dimethylaminoethylacrylate) and 30% water. The treatment is fed as a percent by weight, based on paint, conventionally known in the art as BOP.

TABLE I

Standard Jar Test
Waterborne Paint

| Sample | Paint | BOP | Activator | Rating | Water Clarity |
| --- | --- | --- | --- | --- | --- |
| 1 | PPG (acrylic) | 5% | O | 4+ | Clear – |
| 2 | | 10% | O | 4+ | Clear |
| 3 | General (polyacrylic) | 10% | O | 4+ | Cloudy |
| 4 | | 15% | O | 4+ | Clear |
| 5 | JEMA (synthetic enamel) | 10% | O | 4+ | Cloudy |
| 6 | | 15% | O | 4+ | Clear |
| 7 | PPG (acrylic/epoxy) | 10% | O | 4+ | Clear – |
| 8 | | 15% | O | 4+ | Cloudy |
| 9 | | 10% | NaOH; pH = 9 | 4+ | Clear |

The results of this testing indicate that the inventive composition provided excellent paint detackification and coagulation/flocculation while yielding very clear water.

TABLE II

Standard Jar Test
Solventborne/Waterborne Paint Mixes

| Sample | Paint | BOP | Activator | Rating |
| --- | --- | --- | --- | --- |
| 1 | A | 10% | O | 3 |
| 2 | A | 10% | NaOH; pH = 9 | 4 |
| 3 | A | 15% | NaOH; pH = 9 | 4+ |
| 4 | B | 5% | O | 3 |
| 5 | B | 10% | O | 4+ |
| 6 | C | 10% | O | 4/4+ |
| 7 | C | 15% | O | 4/4+ |
| 8 | C | 10% | NaOH; pH = 9 | 4+ |
| 9 | D | 15% | O | 4/4+ |
| 10 | D | 15% | NaOH; pH = 9 | 4+ |
| 11 | D | 15% | KOH (1200 ppm) | 4+ |
| 12 | D | 15% | Silicate (1600 ppm) | 3 |
| 13 | E | 15% | O | 3+ |
| 14 | E | 10% | KOH (1000 ppm) | 4+ |
| 15 | E | 10% | Silicate (1000 ppm) | 4+ |
| 16 | E | 10% | NaOH; pH = 9 | 4 |

Paint Codes:
A = BASF Melamine solventborne/PPG acrylic waterborne
B = BASF Urethane solventborne/BASF acrylic waterborne
C = BASF Urethane solventborne/PPG acrylic waterborne
D = PPG Melamine solventborne/JEMA clear synthetic waterborne
E = BASF Urethane solventborne/PPG acrylic waterborne As the results of Table II demonstrate, excellent detackification of solventborne/waterborne mixed paints was achieved by the inventive compositions with and without NaOH, KOH or silicate.

TABLE III

Standard Jar Test
Waterborne Paints

| Sample | Paint | BOP | pH | Rating | Water Clarity |
|---|---|---|---|---|---|
| 1 | PPG acrylic | 5% | 8.3 | 4+ | Cloudy |
| 2 | | 10% | 8.3 | 4+ | Clear |
| 3 | | 10% | 10 | 4+ | Cloudy |
| 4 | | 10% | 9 | 4+ | Clear |
| 5 | | 10% | 6 | 4+ | Cloudy |
| 6 | | 10% | 7 | 4+ | Clear |
| 7 | JEMA Clear Synthetic | 10% | 8.1 | 4+ | Cloudy |
| 8 | | 15% | 8 | 4+ | Cloudy |
| 9 | | 20% | 8 | 4+ | Clear |
| 10 | | 20% | 6 | 4+ | Clear |
| 11 | | 20% | 7 | 4+ | Clear |
| 12 | | 20% | 9 | 4+ | Clear |
| 13 | | 20% | 10 | 4+ | Cloudy |
| 14 | PPG acrylic | 10% | 8.3 | 4+ | Clear |
| 15 | | 10% | 6 | 4+ | Cloudy |
| 16 | | 10% | 7 | 4+ | Clear |
| 17 | | 10% | 9 | 4+ | Clear |

This data again demonstrates the effectiveness of the inventive composition at detackification, flocculation and flotation at various water pHs. This also indicates its particular effectiveness in water with pH between 7 and 9 for waterborne paints.

The inventive compositions were tested with a GM waterborne paint in a bench top spray booth. The preliminary jar tests indicated that the paint could be detackified with 10% BOP/NaOH adjusted pH=9.0. The booth was charged with 1000 ppm of Treatment A and adjusted with caustic to pH of 9.0. To simulate actual plant conditions, 500 ppm of MEK/DMEA solvent blend was added to the paint water.

The Treatment A solution was added at a rate of 10% BOP. The GM waterborne paint was sprayed at an average rate of 0.20 g/10 sec. Throughout the test the paint detackification was excellent, and the solids were suspended. A sample of the paint water was treated with 10 ppm of polymer 25 L and 100% of the paint solids floated.

Another bench top spray booth test was performed utilizing the inventive compositions with a CPC-OKC solventborne/Windsor waterborne mixed paint. The booth was charged with 1000 ppm of Treatment A and 1000 ppm of DETAC 831. To simulate actual plant conditions, 500 ppm of MEK/DMEA solvent blend was added to the paint water.

Treatment A was then added at a rate of 10% BOP. The mixed solventborne/waterborne paint was sprayed at an average rate of 0.22 g/10 sec. Throughout the 85 minute test, paint detackification was excellent with very little foaming.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A composition comprising a water soluble or dispersible copolymer of tannin and cationic monomer and aluminum chlorohydrate, wherein said composition has utility at detackifying or coagulating and flocculating waterborne and mixed waterborne/solventborne paints in paint spray booth water.

2. The composition as claimed in claim 1 comprising from 10 to 90 weight percent of said copolymer and from 90 to 10 weight percent of said aluminum chlorohydrate based upon the total weight of said composition.

3. The composition as claimed in claim 1 further comprising water.

4. The composition as claimed in claim 1 wherein said copolymer contains 20 to 80% by weight tannin and 80 to 20% by weight cationic monomer.

5. The composition as claimed in claim 1 wherein said copolymer contains 30 to 50% by weight tannin and 50 to 70% by weight cationic monomer.

6. The composition as claimed in claim 1 wherein said cationic monomer is selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide, and diallyl dimethyl ammonium chloride.

7. The composition as claimed in claim 6 wherein said cationic monomer is methyl chloride quaternary salt of dimethylaminoethyl acrylate.

8. The composition as claimed in claim 1 wherein said tannin is Mimosa tannin.

* * * * *